United States Patent
Kopf

(10) Patent No.: US 7,587,905 B2
(45) Date of Patent: Sep. 15, 2009

(54) ICEMAKER SYSTEM FOR A REFRIGERATOR

(75) Inventor: Bruce A. Kopf, Cedar Rapids, IA (US)

(73) Assignee: Maytag Corporation, Benton Harbor, MI (US)

( * ) Notice: Subject to any disclaimer, the term of this patent is extended or adjusted under 35 U.S.C. 154(b) by 338 days.

(21) Appl. No.: 11/353,942

(22) Filed: Feb. 15, 2006

(65) Prior Publication Data

US 2007/0186570 A1    Aug. 16, 2007

(51) Int. Cl.
*F25C 1/00* (2006.01)
*F25B 49/00* (2006.01)

(52) U.S. Cl. ............................... 62/137; 62/198; 62/441

(58) Field of Classification Search .................. 62/135, 62/137, 198, 228.1, 228.4, 344, 441
See application file for complete search history.

(56) References Cited

U.S. PATENT DOCUMENTS

| 2,674,858 | A |   | 4/1954 | Magnuson et al. |
| 2,942,432 | A |   | 6/1960 | Muffly |
| 3,788,089 | A | * | 1/1974 | Graves ........................ 62/137 |
| 4,452,049 | A |   | 6/1984 | Nelson |
| 4,947,653 | A |   | 8/1990 | Day et al. |
| 5,134,859 | A | * | 8/1992 | Jaster ........................... 62/503 |
| 5,297,394 | A | * | 3/1994 | Frohbieter et al. ............. 62/135 |
| 5,375,432 | A |   | 12/1994 | Cur |
| 5,722,244 | A |   | 3/1998 | Shelton |
| 6,532,751 | B1 | * | 3/2003 | Schenk et al. .................. 62/66 |
| 2006/0086132 | A1 | * | 4/2006 | Maglinger et al. ............. 62/344 |

FOREIGN PATENT DOCUMENTS

JP    403158676    7/1991

* cited by examiner

*Primary Examiner*—Marc E Norman
(74) *Attorney, Agent, or Firm*—Kirk W. Goodwin; Diederiks & Whitelaw PLC

(57) ABSTRACT

An icemaker system provided in a refrigerator is designed to reduce an amount of time required to produce ice. The refrigerator includes a refrigeration system including a number of refrigeration components and a refrigeration loop. The refrigeration loop includes an icemaker section that carries a flow of refrigerant to an ice mold portion of the icemaker system and a bypass section that isolates the icemaker system from the flow of refrigerant. A control system automatically activates the icemaker system regardless of a need for cooling. That is, upon sensing a demand for ice, the control system opens a valve to cause refrigerant to flow through the icemaker section and activates the refrigeration components to speed ice production whether or not additional cooling is required in fresh food and/or freezer compartments.

9 Claims, 2 Drawing Sheets

ICEMAKER SYSTEM FOR A REFRIGERATOR

BACKGROUND OF THE INVENTION

1. Field of the Invention

The present invention pertains to the art of refrigerators and, more particularly, to an icemaker system for in a refrigerator.

2. Discussion of the Prior Art

Whether it be to ensure an adequate amount of ice for a party or keep up with daily demand, there is always a need to decrease ice production time. In the art of refrigerated appliances, it is known to employ fans or other similar devices to decrease an amount of time required to produce ice. Typically, the fan is oriented to direct air from an evaporator portion of the refrigerator across an ice mold. The flow of air disturbs a thermal barrier that is present at the ice mold increasing temperature transfer rates and, as a consequence, decreasing ice production time.

While the above arrangements utilize fans to blow evaporator air across the ice mold, other arrangements directly expose the ice mold to the evaporator. The evaporator is part of a primary refrigeration system that is employed to maintain temperatures in a fresh food and freezer compartment of the refrigerator. While effective, the above described systems typically rely on a cooling demand signal. That is, regardless of the need for ice, the above described systems only function when either the fresh food or freezer compartments require cooling which necessitates the activation of the refrigeration system. Correspondingly, even during periods when no ice production is required, the above described systems function upon activation of the refrigeration system.

Regardless of the teachings in the prior art, there still exists a need for a system to reduce ice production time in a refrigerator. More specifically, there exists a need for a system that can, upon demand, decrease ice production time regardless of a need for cooling in the refrigerator.

SUMMARY OF THE INVENTION

The present invention is directed to a refrigerator including a fresh food compartment, a freezer compartment, a refrigeration system and an icemaker. In accordance with the invention, the refrigeration system includes a plurality of refrigeration components which operate synergistically to establish and maintain desired temperatures in the refrigerator. The refrigeration components include at least a preferably variable speed compressor, a condenser and a condenser fan. In addition, the refrigeration system includes a refrigeration loop that carries a flow of refrigerant to the plurality of refrigeration components. The refrigerator also includes various sensors that monitor temperature conditions within the fresh food and freezer compartments, as well as a level of ice in, for example, an ice storage bin portion the icemaker.

In further accordance with the invention, a portion of the refrigeration loop passes through the icemaker. More specifically, the refrigeration loop includes an ice maker section that passes through an ice mold portion of the icemaker. In this manner, the flow of refrigerant passing through the refrigeration loop supplies additional cooling to speed the production of ice. In still further accordance with the invention, the refrigeration loop includes a diverter valve and an icemaker bypass. The diverter valve is selectively closed to divert the flow of refrigerant away from the icemaker section and into the icemaker bypass during periods of low or no ice demand.

In accordance with the most preferred form of the invention, the refrigerator includes a controller that is operatively coupled to each of the refrigeration system and the icemaker. The controller, upon sensing a need for an ice production cycle, activates the refrigeration system regardless of a need for cooling in the fresh food and/or freezer compartments.

Additional objects, features and advantages of the present invention will become more readily apparent from the following detailed description of a preferred embodiment when taken in conjunction with the drawings wherein like reference numerals refer to corresponding parts in the several views.

DETAILED DESCRIPTION OF THE PREFERRED EMBODIMENT

Figure 1:
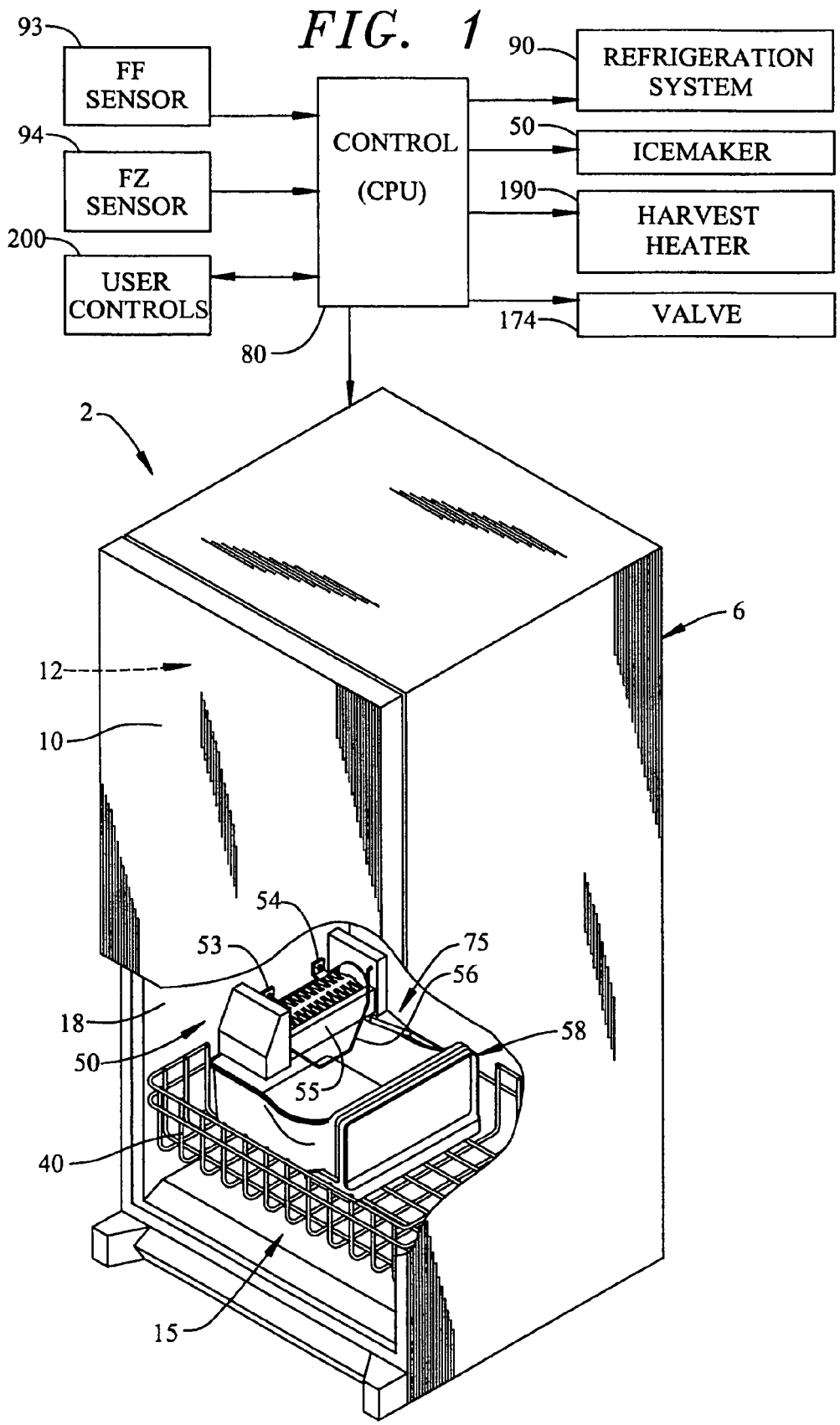
FIG. 1 is a partial perspective view of a bottom-mount refrigerator incorporating an icemaker system constructed in accordance with the present invention.
Figure 2:
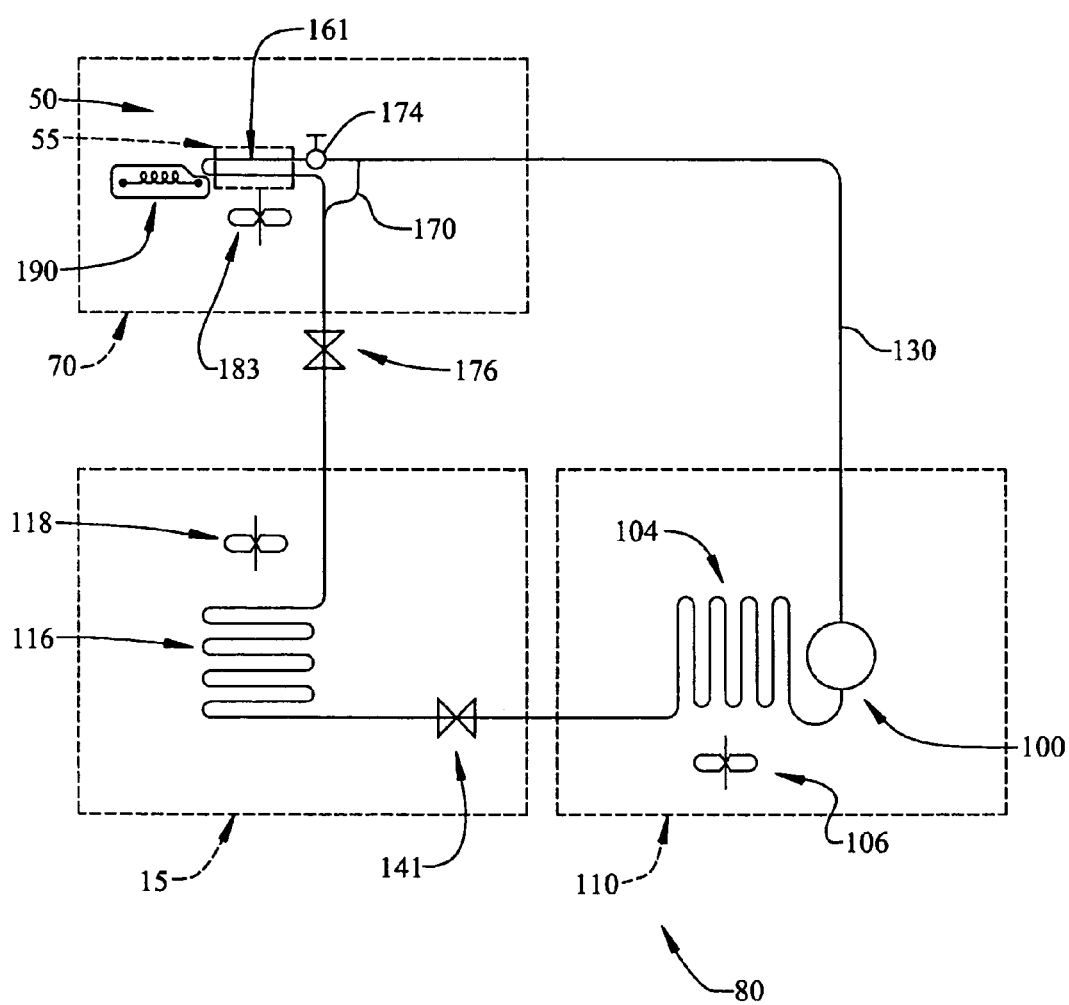
FIG. 2 is a schematic representation of the icemaker coupled to a refrigeration system of the present invention.

With initial reference to FIGS. 1 and 2, a refrigerator constructed in accordance with the present invention is generally indicated at 2. As shown, refrigerator 2 includes a cabinet shell 6 provided with an upper fresh food compartment door 10 which is adapted to close off an upper fresh food compartment 12. As known in the art, fresh food door 10 is adapted to pivot about a vertical axis defined by upper and lower hinges (not shown). Within cabinet shell 6 is also defined a freezer compartment, generally indicated at 15, which is defined by a liner 18. Although not shown, freezer compartment 15 is adapted to be closed off by means of a door. With this general construction, refrigerator 2 defines a bottom mount style unit. As known in the art, the door associated with freezer compartment 15 can either be mounted for a pivotable movement about a vertical axis similar to fresh food door 10, or mounted upon slide assemblies which permit linear shifting of the freezer door relative to cabinet shell 6.

Mounted within freezer compartment 15 is a drawer that preferably takes the form of a basket 40. As shown, basket 40 generally has a meshed wire construction. However, as will become fully evident upon reading the remainder of this description, the drawer can take various forms in accordance with the overall invention. At this point, it is simply important to note that basket 40 can be selectively shifted into and out of freezer compartment 15. Although not depicted in this figure, there may be one or more additional baskets within freezer compartment 15 that provide additional storage for food items.

Also shown mounted in freezer compartment 15 is an icemaker 50. Ice maker 50 is fixed against liner 18 at brackets 53 and 54 and includes an ice mold 55 and a bail arm 56. In the embodiment shown, an ice storage bin 58 is positioned below icemaker 50 so as to receive and retain a quantity of ice produced by icemaker 50 for use by a consumer(s). In a manner widely known in the art, bail arm 56 is adapted to be raised and lowered based on a level of ice present in ice storage bin 58. Actually, bail arm 56 acts as a sensor that determines when the quantity of ice in ice storage bin 58 falls below a predetermined level in order to signal the need for a new ice production cycle. At this point it should be understood that, while shown mounted in freezer compartment 15, icemaker 50 could also be located in fresh food compartment 12 in a specialty or icemaker compartment shown schematically at 70 in FIG. 2.

Refrigerator 2 includes a control system 80 that selectively activates a refrigeration system 90 to establish and maintain a selected temperature in fresh food compartment 12 and freezer compartment 15. Towards that end, if a demand for cooling is sensed, such as by a fresh food compartment sensor 93 located in fresh food compartment 12 and/or a freezer compartment sensor 94 located in freezer compartment 15, refrigeration system 80 is activated to ensure that refrigerator 2 is maintained at the selected temperature(s). In order to satisfy the demand for cooling, refrigeration system 90 includes a plurality of refrigeration components. In accordance with the invention as represented best in FIG. 2, the refrigeration components include a compressor 100, a condenser 104 and a condenser fan 106 which are preferably arranged in a mechanical zone 110 of refrigerator 2. In addition, arranged at or near freezer compartment 15 is an evaporator 116 having an associated evaporator fan 118. The refrigeration components and, more specifically, the compressor 100, condenser 104 and evaporator 116 are interconnected by a refrigeration loop 130 which carries a flow of refrigerant. In order to optimize the cooling capabilities of refrigeration system 90, an expansion valve 141 is arranged in refrigeration loop 130 between evaporator 116 and condenser 104.

In a manner known in the art, compressor 100 establishes or creates a flow of compressed refrigerant which is guided towards evaporator 116. Evaporator fan 118 establishes an airflow across evaporator 116 which is cooled by the compressed refrigerant. The cooled airflow passes into freezer compartment 15 to establish and maintain the selected temperature therein. After passing through evaporator 116, the now warm flow of refrigerant passes into condenser 104. Condenser fan 106 creates an airflow across condenser 104 to dissipate heat carried by the flow of refrigerant. At this point, the refrigerant re-enters compressor 100 to start the cycle anew.

In accordance with the invention, refrigeration loop 130 includes an icemaker section 161 that passes through icemaker 50. Preferably, icemaker section 161 extends directly adjacent to or is integrally formed into ice mold 55. In any case, icemaker section 161 guides compressed or cold refrigerant about ice mold 55 in order to speed the formation of ice crystals in icemaker 50. In further accordance with the invention, refrigeration loop 130 includes an icemaker bypass section 170 that selectively isolates icemaker section 161 from refrigeration loop 130. More specifically, a valve 174, operatively connected to control system 80, is positioned downstream of icemaker bypass portion 170 in icemaker section 161. Valve 174 is shiftable between an open position allowing refrigerant to pass into icemaker section 161 and through ice mold 55 and a closed position causing all of the flow of refrigerant to pass through icemaker bypass section 170. With this arrangement, refrigerant passes through icemaker section 161 only during an ice production cycle and control system 80 can optimize the flow of refrigerant in refrigeration system 90. In order further optimize or provide additional efficiency gains in refrigeration system 90, a second expansion valve 176 is preferably arranged between icemaker section 161 and evaporator 116.

In accordance with the most preferred form of the present invention, when the quantity of ice falls below a predetermined level in ice storage bin 58, control system 80 initiates an ice production cycle which, regardless of a need for cooling in fresh food compartment 12 or freezer compartment 15, activates refrigeration system 90. Once activated, valve 174 opens, thereby allowing the flow of refrigerant to pass into icemaker section 161 and circulate about ice mold 55 to provide additional cooling to facilitate the production of ice crystals. This additional cooling is particularly necessary if icemaker 50 is located within fresh food compartment 12. Further enhancement in ice production is achieved by the inclusion of a fan 183 used to direct a cooling airflow onto ice mold 55.

In accordance with one aspect of the invention, compressor 100 is constituted by a variable speed compressor. By incorporating a variable speed compressor into refrigeration system 90, the flow of refrigerant through refrigeration loop 130 can be optimized. More specifically, during periods of no ice production or no need for an ice production cycle, compressor 100 can operate at a low speed. Likewise, during periods when only cooling is needed in fresh food compartment 12 or freezer compartment 15, variable speed compressor 100 can be operated at a low speed. However, in the event that fresh food compartment 12 and/or freezer compartment 15 require cooling and an ice production cycle is needed, variable speed compressor 100 can be operated at a full speed to ensure the optimal flow of refrigerant through refrigeration loop 130.

In accordance with another aspect of the present invention, control system 80 can selectively activate a harvest heater 190 in order to slow the formation of ice crystals in ice mold 55. That is, a consumer can select a clear ice mode for icemaker 50 through user controls 200 which preferably constitute a combination input panel/display unit located within cabinet 6 or on fresh food compartment door 10. The clear ice mode actually slows the production of ice, thereby allowing air trapped in the ice mold to escape forming substantially, perfectly clear ice cubes.

Based on the above, it should be understood that the icemaker system of the present invention provides an efficient mechanism for reducing ice production time in a refrigerator. More specifically, the present invention, in addition to speeding ice production time in an icemaker provided in a freezer compartment of the refrigerator, will foster faster ice production in an icemaker compartment located in a fresh food compartment of the refrigerator. That is, by directing refrigerant directly through the ice mold, the icemaker will rapidly form ice crystals despite the lower temperatures in the fresh food compartment. Therefore, while shown in connection with a bottom mount refrigerator, the icemaker system of the present invention could also be employed in top mount, side-by-side, French door or the like models.

Although described with reference to a preferred embodiment of the invention, it should be readily understood that various changes and/or modifications can be made to the invention without departing from the spirit thereof. For instance, although the rapid ice mode is preferably, automatically established based on the position of bail arm 56, a user could also establish the rapid ice mode through user control 200. This feature could be extremely beneficial in connection with a party or other gathering when the user knows that an abundance of ice will be needed in a relatively short period of time. In general, the invention is only intended to be limited by the scope of the following claims.

I claim:

1. A refrigerator comprising:
   a cabinet;
   a fresh food compartment defined within the cabinet;
   a freezer compartment defined within the cabinet;
   an icemaker arranged in one of the fresh food and freezer compartments;
   a refrigeration system for cooling the fresh food and freezer compartments, said refrigeration system having a plurality of refrigeration components, including at least a variable speed compressor, a sole evaporator and a condenser, interconnected through a refrigeration loop that carries a flow of refrigerant to the plurality of refrigeration components, said refrigeration loop including an icemaker section extending to the icemaker;

a temperature sensor arranged in one of the fresh food and freezer compartments, said temperature sensor providing a signal to activate the refrigeration system upon detecting a need for cooling;

an icemaker bypass connected to the refrigeration loop, said icemaker bypass selectively diverting refrigerant so as to isolate the portion of the refrigeration loop extending to the icemaker;

an ice storage bin for retaining a quantity of ice;

a sensor for sensing an amount of ice in the ice storage bin, said sensor triggering an ice production cycle if the amount of ice in the ice storage bin falls below a predetermined level;

a valve arranged in the portion of the refrigeration loop passing through the icemaker, said valve directing refrigerant to one of the portion of the refrigeration loop extending to the icemaker and the icemaker bypass;

a harvest heater arranged in the icemaker, said harvest heater being selectively activated to establish a clear ice making operation; and a control system operatively coupled to each of the refrigeration system and the icemaker, wherein upon sensing a need for an ice production cycle, said control system activates the refrigeration system regardless of a need for cooling in the fresh food or freezer compartments.

2. A refrigerator comprising:

a cabinet;

a fresh food compartment defined within the cabinet;

a freezer compartment defined within the cabinet;

an icemaker arranged in one of the fresh food and freezer compartments;

a refrigeration system for cooling the fresh food and freezer compartments and the icemaker, the refrigeration system including a refrigeration loop having a compartment section that carries a flow of refrigerant to the fresh food and freezer compartments and an icemaker section that carries a flow of refrigerant to the icemaker, with the icemaker section being downstream of the compartment section;

a temperature sensor arranged in one of the fresh food and freezer compartments, said temperature sensor providing a signal to activate the refrigeration system upon detecting a need for cooling;

an ice storage bin for retaining a quantity of ice produced by the icemaker;

a sensor for sensing an amount of ice in the ice storage bin, said sensor triggering an ice production cycle if the amount of ice in the ice storage bin falls below a predetermined level; and a control system operatively coupled to each of the refrigeration system and the icemaker wherein, upon sensing a need for an ice production cycle, said control system activates the refrigeration system regardless of a need for cooling in the fresh food or freezer compartments.

3. The refrigerator according to claim 2, wherein the refrigeration system includes a variable speed compressor, said control system operating the variable speed compressor so as to optimize operation of the ice maker.

4. The refrigerator according to claim 2, wherein the icemaker includes an ice mold, said icemaker section of the refrigeration loop being integrally formed with the ice mold.

5. The refrigerator according to claim 2, further comprising: an icemaker compartment within which the icemaker is positioned.

6. The refrigerator according to claim 2, further comprising: a fan for directing a cooling airflow across the icemaker, said fan being operated by the control system upon sensing a need for ice production.

7. The refrigerator according to claim 2, further comprising: a harvest heater, said control system being operable in a clear ice mode wherein the harvest heater is activated to slow a formation of ice cubes.

8. The refrigerator according to claim 2, wherein the refrigeration loop further includes an icemaker bypass, said icemaker bypass selectively diverting the flow of refrigerant away from the icemaker.

9. The refrigerator according to claim 8, further comprising: a valve arranged in the icemaker section of the refrigeration loop, said valve controlling a flow of refrigerant to the icemaker section.

* * * * *

UNITED STATES PATENT AND TRADEMARK OFFICE
CERTIFICATE OF CORRECTION

PATENT NO. : 7,587,905 B2 Page 1 of 1
APPLICATION NO. : 11/353942
DATED : September 15, 2009
INVENTOR(S) : Bruce A. Kopf It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 550 days.

Signed and Sealed this

Twenty-first Day of September, 2010

David J. Kappos
*Director of the United States Patent and Trademark Office*